United States Patent [19]

Kallin et al.

[11] Patent Number: 4,764,976

[45] Date of Patent: Aug. 16, 1988

[54] DOCUMENT READER MODULE

[75] Inventors: Fredrik L. N. Kallin, Kitchener; Marek W. Czesnik, Waterloo; Mark M. Mach, Kitchener, all of Canada

[73] Assignee: NCR Corporation, Dayton, Ohio

[21] Appl. No.: 878,726

[22] Filed: Jun. 26, 1986

[51] Int. Cl.$^4$ .............................................. G06K 9/44
[52] U.S. Cl. ........................................ 382/65; 382/1; 382/7; 209/569; 271/264; 271/273; 235/439; 235/470; 235/484; 235/485
[58] Field of Search ................ 209/569; 271/264, 273; 382/1, 7, 45, 65; 364/516, 478; 235/436, 439, 444, 446, 449, 453, 454, 470, 484, 485, 493

[56] References Cited

U.S. PATENT DOCUMENTS

| | | | |
|---|---|---|---|
| 3,757,942 | 9/1973 | Gunn | 209/569 |
| 3,825,950 | 7/1974 | Kobayashi et al. | 271/52 |
| 3,872,433 | 3/1975 | Holmes et al. | 382/45 |
| 4,167,664 | 9/1979 | Pass | 235/449 |
| 4,245,211 | 1/1981 | Kao | 382/7 |
| 4,309,601 | 1/1982 | Nally et al. | 235/449 |
| 4,457,017 | 6/1984 | Onogi et al. | 382/45 |

FOREIGN PATENT DOCUMENTS 0188272 7/1986 European Pat. Off. .

OTHER PUBLICATIONS

Bergschneider, B. D. et al., "Pressure Roll Assembly for Document Cards," *IBM Tech. Discl. Bull.*, vol. 14, No. 5, Oct. 1971, (N.Y.), pp. 1484-1485.

Hitachi Seisakusho K.K., Patent Abstracts of Japan, vol. 7, No. 188 (P-217) (1333), 8-17-83, Jp., A, 5887661, 5-15-83.

*Primary Examiner*—Leo H. Boudreau
*Assistant Examiner*—Jose L. Couso
*Attorney, Agent, or Firm*—Wilbert Hawk, Jr.; Albert L. Sessler, Jr.; Elmer Wargo

[57] ABSTRACT

A document reader module which provides precise alignment for the document being read and the associated reader, like an optical reader. An integrated frame member provides accurate control surfaces for the precise alignment mentioned. An elevator mechanism mounted on the frame member provides an apparatus for adjusting the read head relative to the line of data on the documents being read. A special pinch roller construction, which can be locked in a retracted position, facilitates the removal of jammed documents from the associated document track.

22 Claims, 9 Drawing Sheets

DOCUMENT READER MODULE

BACKGROUND OF THE INVENTION

This invention relates generally to document readers, and more specifically, it relates to a document reader which provides precise alignment for the document being read and for the associated reader, like an optical reader, for example.

In the processing of documents, like checks and deposit slips, for example, the documents are moved sequentially on their long, lower edges within a document track past a reader which reads data from the documents. In some prior art readers, the associated document track and the associated document backstop are made of plastic material which tends to warp, causing the distance between the reader and the backstop to vary by a few thousands of an inch. This variation in distance causes incorrect reading by the reader which may be an optical reader for use in Optical Character Recognition (OCR).

For optical readers, it is important that the reading plane on the document be positioned parallel to the reading plane in the optical reading device itself. This presented alignment problems, especially when the optical reader had to be mounted on some portion of the cabinetry associated with the reader.

Optical readers have to be cleaned periodically to remove dirt and dust particles which accumulate in the reader. Very often this means that after cleaning, the reader has to be re-adjusted relative to the documents to be read. In some prior art readers, this cleaning and re-adjusting procedure is tedious and time-consuming.

SUMMARY OF THE INVENTION

In contrast with the above, a document reader made according to this invention obviates the problems mentioned above and includes a frame member having first and second planar surfaces fixed in spaced, parallel relationship with each other and a guide surface which is upstanding from the frame member and perpendicular to the first planar surface. The document reader also includes transporting means for moving the documents on their lower edges along a line which is parallel to the first planar surface and also for moving the documents in a plane which is parallel to the guide surface. The document reader also includes a read head; support means for supporting the read head for movement in a direction which is perpendicular to the first planar surface and parallel to the guide surface; and adjusting means for adjustably fixing the read head at a predetermined distance from the first planar surface. The adjusting means includes an indicator which is coupled to the read head to move therewith and which cooperates with a document positioned on the second planar surface to thereby position the read head the predetermined distance from the first planar surface.

The features and advantages of this invention will become more readily understood in connection with the following description, claims, and drawings.

DETAILED DESCRIPTION OF THE INVENTION

Figure 1:
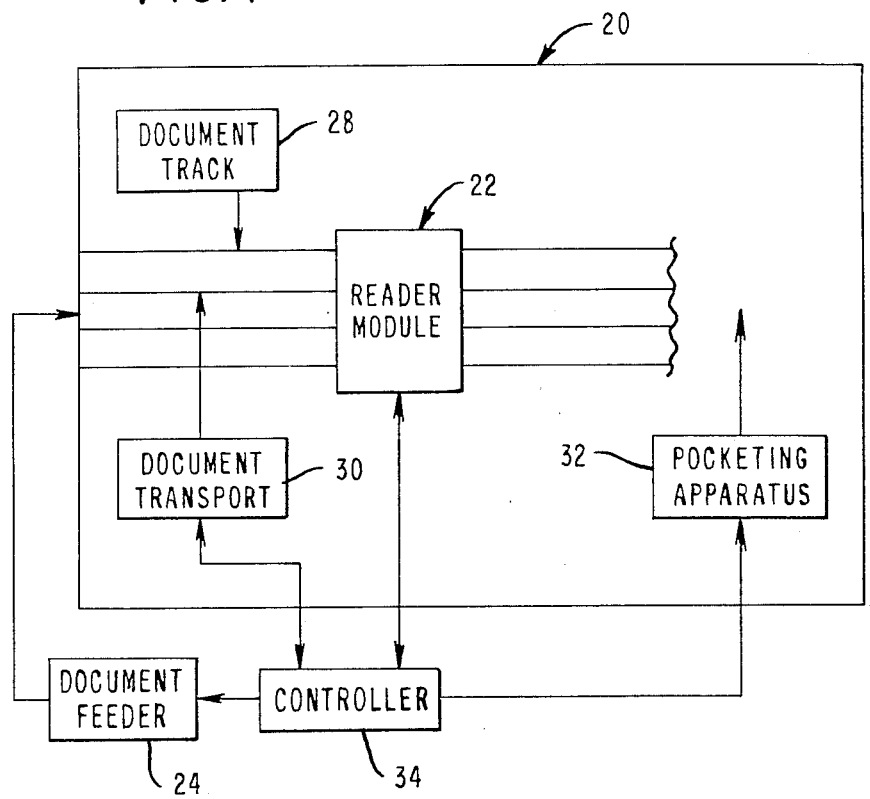
FIG. 1 is a plan view, in diagrammatic form, of a document processing machine in which a preferred embodiment of the reader module of this invention may be used.

FIG. 1 is a schematic diagram showing a document processing machine or apparatus 20 in which a preferred embodiment of the reader module 22 of this invention may be incorporated. The apparatus 20 includes a conventional document feeder 24 which sequentially feeds documents 26 (FIG. 2) like checks and deposit slips, for example, into a document track 28. The documents 26 are moved singly (on their long lower sides) in spaced relation by a document transport 30, and they are also moved in reading relationships with the reader module 22. After reading, the documents 26 may be subjected to additional operations, like microfilming and endorsing, for example, which are not important to an understanding of this invention. Thereafter, the documents 26 are pocketed by a conventional pocketing apparatus 32. The reader module 22 is controlled by the controller 34 as will be described hereinafter. The document feeder 24, the document transport 30, and the pocketing apparatus 32 are controlled by the controller 34 which is conventional.

Figure 2:
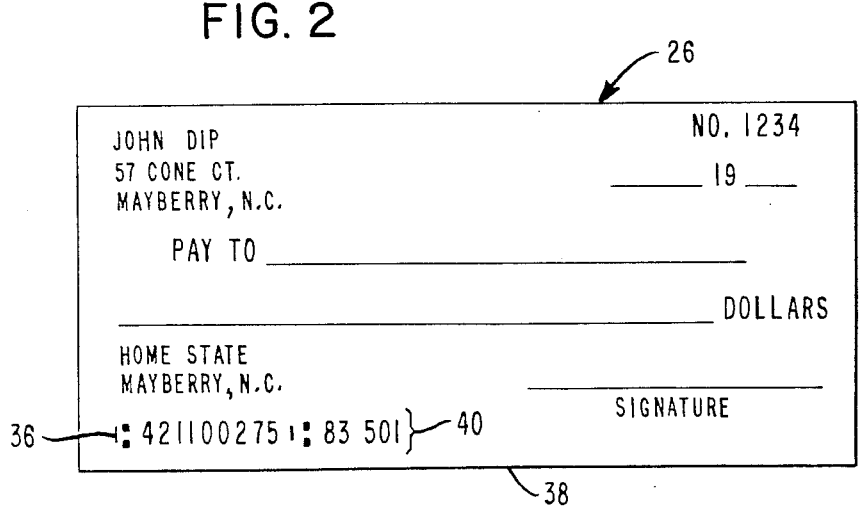
FIG. 2 is a plan view of a document which may be processed in the machine shown in FIG. 1.

FIG. 2 shows a typical document 26, like a check, which may be read by the reader module 22 shown in FIG. 1. The particular data which is read by the reader module 22 includes the MICR (Magnetic Ink Character Recognition) line 36. This line 36 is printed in magnetic ink according to certain printing styles or fonts and contains data about the drawer's bank, account number, check number, etc. The line 36 of data is generally read with a magnetic read head; however, this same line 36 is also read by an optical reader in certain instances. When this is done, the data read magnetically and the data read optically are evaluated by the controller 34 to increase the accuracy of reading. Because this aspect is conventional, it need not be described in any further detail.

As stated earlier herein, certain misalignment problems (between the document track and reader) associated with prior art reading apparatuses caused improper readings. Another problem with prior art readers was that after periodic cleaning of the read head, it was time-consuming to re-align the read head at the appropriate level for reading. In this regard, a read head is set at a certain level above the lower long edge 38 of the documents 26, as indicated by bracket 40 in FIG. 2, so as to embrace or cover the MICR line 36 on the documents 26 for the documents anticipated to be read by the apparatus 20. The reader module 22 is especially useful in overcoming these two problems mentioned.

Figure 3:
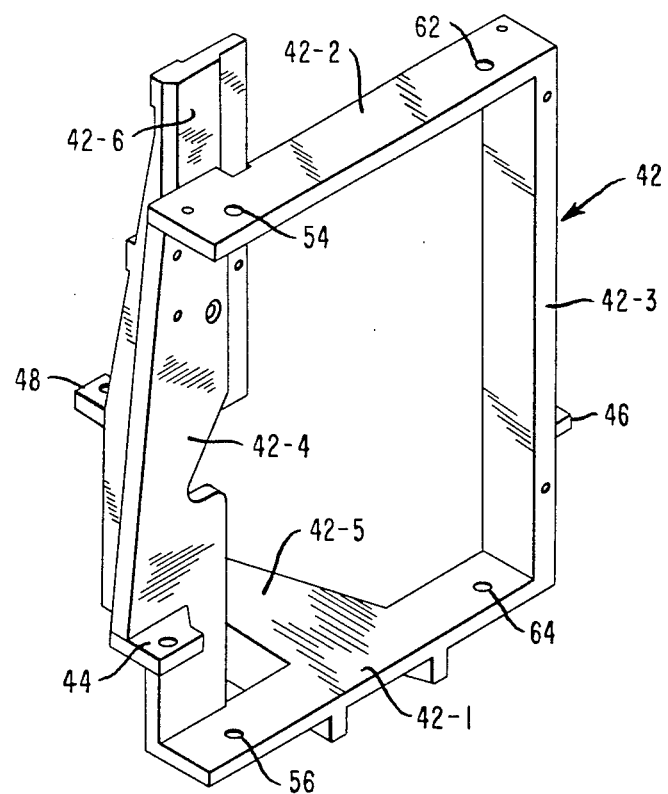
FIG. 3 is an isometric view of a frame member included in the reader module shown in FIG. 1.

In order to reduce the misalignment problems mentioned, the reader module 22 includes a frame member 42, shown in isometric view in FIG. 3. The frame member 42 includes the bottom section 42-1, top section 42-2 and side sections 42-3 and 42-4 which are formed into the general, quadrilateral shape shown. The bottom section 42-1 has a rib-reinforced, cantilever section 42-5 extending therefrom and a guide surface 42-6. The guide surface 42-6 is perpendicular to the planar surface of bottom section 42-1, and it is reinforced by a rib 42-7 (FIG. 5) to maintain this position. The frame member 42 also has mounting lugs 44, 46, and 48 which enable it to be mounted in an opening 50 in the supporting plate 52 (FIG. 8) which supports the entire reader module 22. When the frame member 42 is secured to the supporting plate 52, the first or bottom section 42-1 of the frame member 42 is located parallel to the plane of the supporting plate 52, and accordingly, the guide surface 42-6 is perpendicular to the supporting plate 52.

Figure 4:
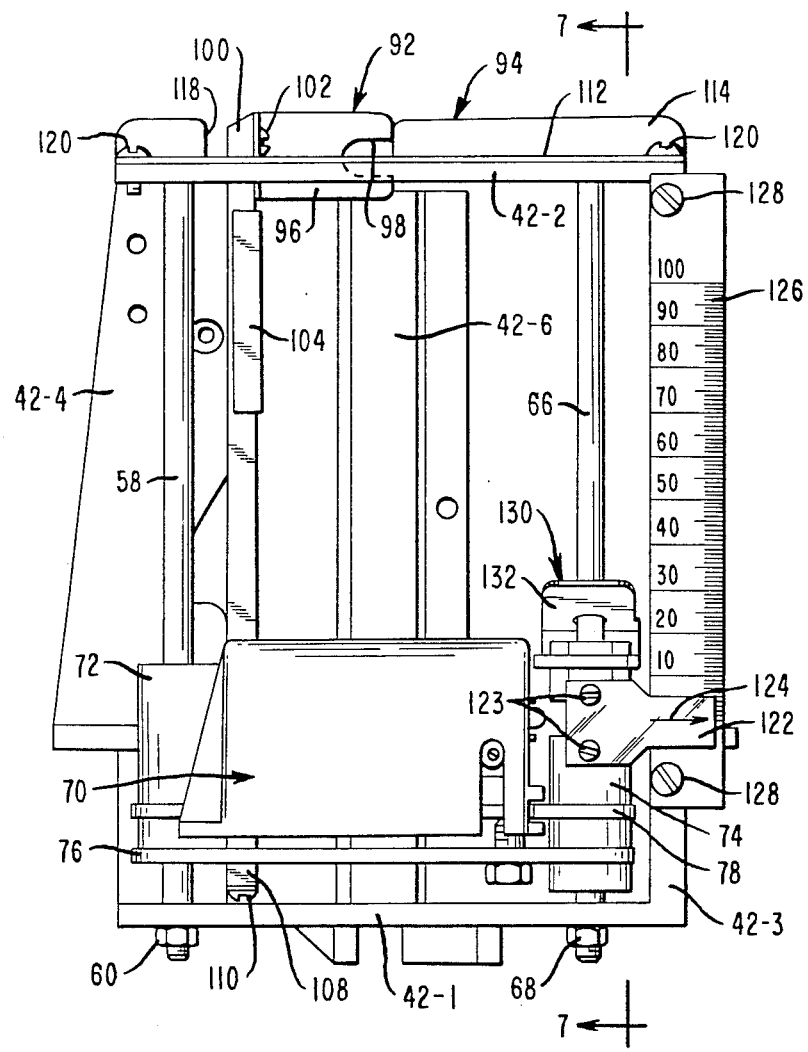
FIG. 4 is a front view of the frame member shown in FIG. 3, with a read head and a read-head-aligning mechanism shown thereon.

The frame member 42 (FIG. 3) has aligned holes 54 and 56 therein to receive the rod 58. The upper end of rod 58 is threadedly received in hole 54 and the lower end of rod 58 is secured to the bottom section 42-1 by a fastener 60 (FIG. 4). Similarly, the frame member 42 has aligned holes 62 and 64 therein (FIG. 3) to receive the rod 66 (FIG. 4) which is also secured to the bottom section 42-1 by a fastener 68. The rods 58 and 66 are positioned parallel to the guide surface 42-6.

In the embodiment described, an optical read head designated generally as 70 is mounted on the rods 58 and 66 to enable it to be adjusted in a plane which is parallel to the guide surface 42-6 (FIG. 4) so as to enable the read head 70 to be moved towards and away from the lower edge 38 (FIG. 2) of a document 26. This adjustment enables the output of the read head 70 to be optimized for the range of MICR data appearing along the MICR lines 36 of the documents 26 expected to be processed.

The read head 70 has extensions 72 and 74 which are apertured to function as bearings to slidably support the read head 70 on the rods 58 and 66 to enable it to be moved up and down as viewed in FIG. 4. A cross bar 76 is used to enable both extensions 72 and 74 to be moved as a unit, and an extension 78 (best shown in FIG. 7) is used to raise and lower the read head.

The read head 70 is conventional, and in the embodiment described, it is an optical read head. The read head 70 (FIG. 6) includes a source of light or bulb 80 which is directed to illuminate the MICR line 36 of data as the document 26 is moved to the reading station, designated generally as 82, by the document transport 30. A wire bracket 84 protects the bulb 80 from damage and also protects an operator from getting accidentally burned by a heated bulb 80. The read head 70, which is conventional, also includes a lens system (not shown) for directing reflected light from a document 26 to a light sensitive array (not shown) like a line-scan image sensor which is manufactured by Fairchild Corporation, for example. The output of the light array is processed and routed to the controller 34 where conventional character recognition techniques are employed to read the MICR line 36 of data from the document 26. Note that while the line 36 of data is MICR data, it is being read optically by optical reader 70. A resilient deflector 86 (best seen in FIGS. 5, 6, and 8) is used to maintain a document 26 being read in sliding contact with the guide surface 42-6 of the frame member 42. This assures accurate focussing by the lens system in the read head 70 and thereby enables subsequent, accurate character recognition. When a document 26 passes the read station 82, its long, lower edge 38 (FIG. 2) is supported at areas 88 and 90 (FIG. 8) which represent the bottom of the document track 28; this positions the lower edge 38 of the document 26 parallel to the bottom section 42-1 (FIG. 3) of the frame 42 and at a constant location so as to enable the read head 70 to be adjusted and fixed relative to the MICR line 36 of data.

The means for adjusting the read head 70 relative to the MICR line 36 includes the rods 58 and 66 and the extensions 72 and 74 already described, and it also includes an indicator 92 (FIG. 4) and a supplemental, document-guiding member 94. The indicator 92 has a planar portion 96 having an area removed therefrom to leave a notch or cut out 98. The planar portion 96 also has a right angle bend therein to enable it to be fastened to a square rod 100 by fasteners 102. The square rod 100 is slidably supported for vertical movement (as viewed in FIG. 4) in a sleeve 104 which is generally "U"-shaped in cross section (to receive the square rod 100) and which also has an extension 106 (FIG. 6) which is secured to the side section 42-4 of the frame member 42 by fasteners 107. The lower side of the rod 100 is coupled to the read head 70 to move therewith by a magnet 108 (FIG. 4) which is secured to the lower end of the rod 100 by a fastener 110. By this construction, when the read head 70 is moved upwardly (as viewed in FIG. 4) the indicator 92 is also moved upwardly due to the coupling between the magnet 108 and the read head 70.

Figure 8:
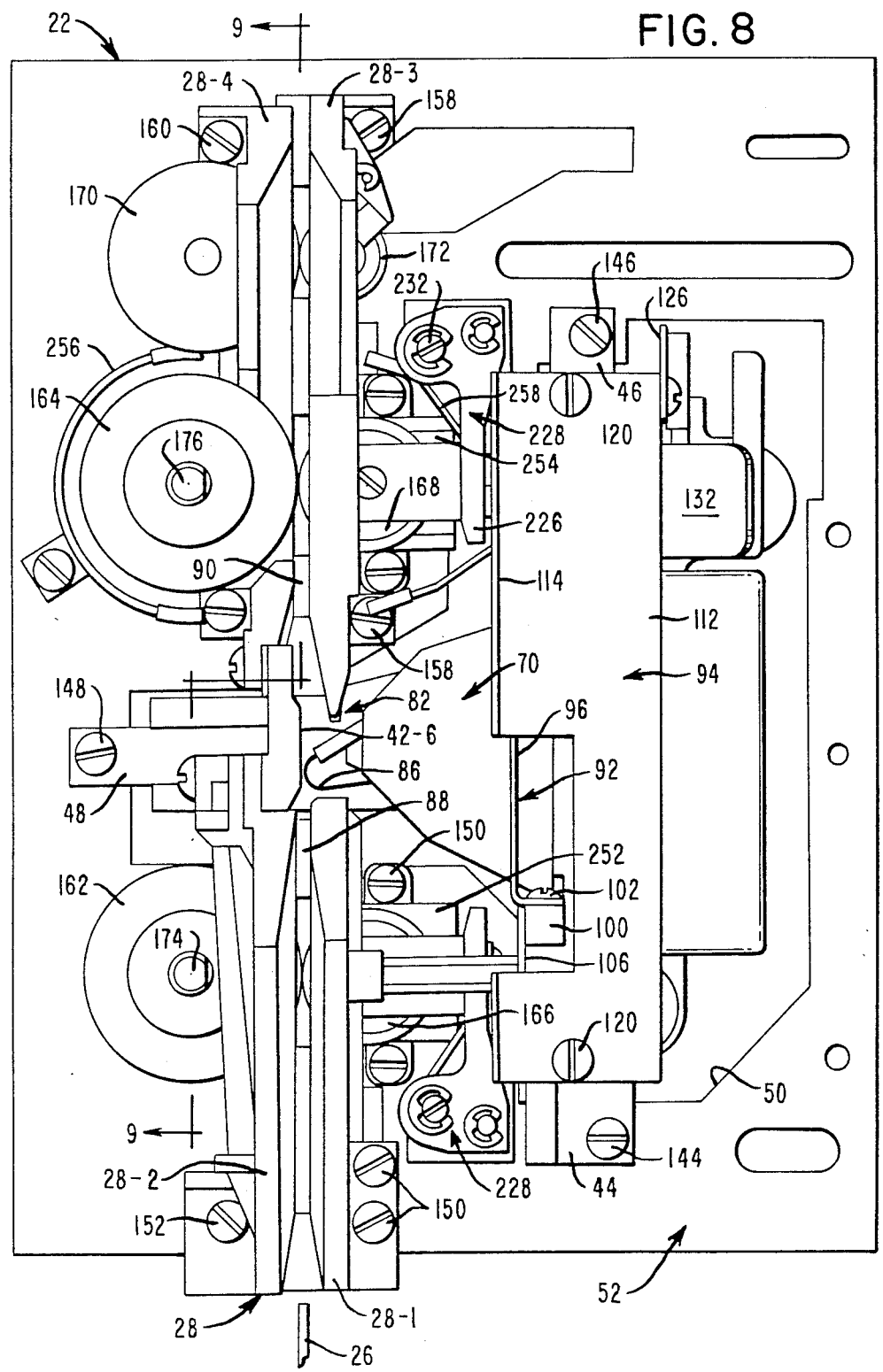
FIG. 8 is a plan view of the reader module shown schematically in FIG. 1.

The means for adjusting the read head 70 relative to the MICR line 36 also includes the supplemental guiding member 94 already alluded to. The member 94 has a first planar section 112 (FIGS. 4, 5, 6) and a second planar section 114 which is positioned at a right angle thereto as shown best in FIG. 5. The planar sections 112 and 114 have notched out areas 116 (FIG. 6) and 118 (FIG. 4), respectively, to receive the indicator 92 therebetween. The member 94 is fastened to the top section 42-2 of the frame member 42 by fasteners 120 so that the planar section 112 is parallel to the bottom section 42-1 of the frame member 42 and to the supporting plate 52. Notice, as shown in FIG. 8, that the indicator 92 is parallel to and slightly spaced from the planar section 114; this enables a document 26 to be positioned between the planar section 114 and the indicator 92 while the longer, lower edge 38 of a document 26 rests on a planar section 112. With a document 26 so positioned, the read head 70 can be adjusted as will be described hereinafter.

The read head 70 also has a transparent pointer 122 (FIG. 4) secured to the extension 74 (by fasteners 123) to enable the pointer 122 to be moved when the read head 70 is moved. The pointer has an arrow 124 thereon which is used in conjunction with a graduated scale 126 which is positioned vertically on the side section 42-3 of the frame member 42 by fasteners 128. The pointer 124 and scale 126 are used to re-position the read head 70 at a predetermined height after cleaning the read head 70, for example.

Figure 7:
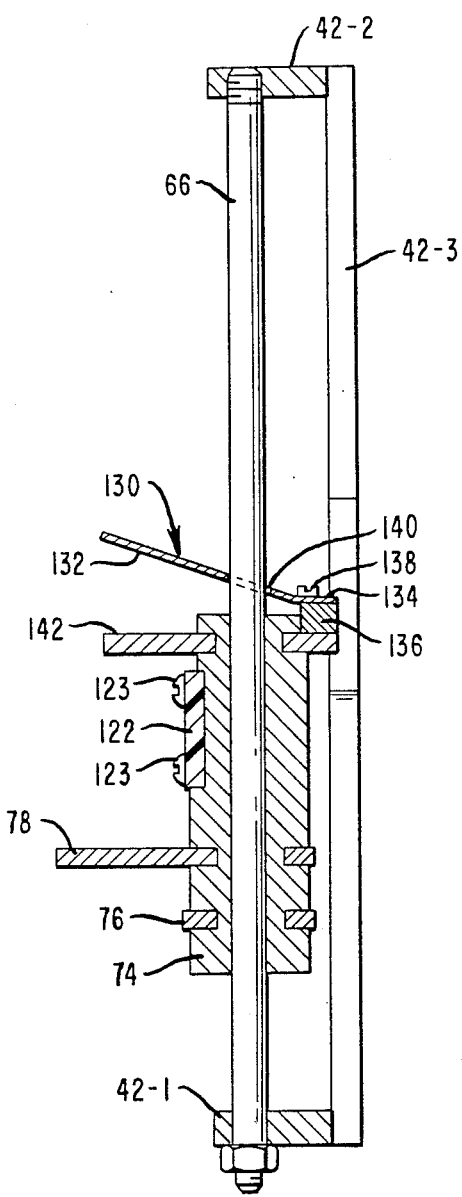
FIG. 7 is a side view, in elevation and partly in cross section, showing a mechanism which locks an elevator assembly (including the read head) to a vertical shaft, with the view taken approximately along the line 7—7 of FIG. 4.

The read head 70 is locked in a predetermined position by the locking device 130, shown best in FIGS. 4 and 7. The device 130 includes a planar spring member 132 having an offset end 134 (FIG. 7) which is secured to a support 136 by a fastener 138. The support 136 is secured to the extension 74 to which the read head 70 is secured as previously described. The spring member 132 has an opening 140 (FIG. 7) therein which receives the rod 66. A planar support 142, secured to the extension 74 and positioned below the planar spring member 132 as shown in FIG. 7, is used to facilitate moving the spring member 132 towards the planar support 142. When this is done, the spring member 132 (at opening 140) does not bear against the rod 66, and consequently, the read head 70 can be moved up and down. Usually, the planar spring member 132 is held in the "unlocked" position by placing an index finger under the planar support 142 and "squeezing" the planar spring member 132 with the associated thumb. When the planar spring member 132 is released, the member 132 moves upwardly (as viewed in FIG. 7) causing a portion of the member adjacent to the hole 140 to abrade against the rod 66 to hold the read head 70 in a "locked" position.

Figure 5:
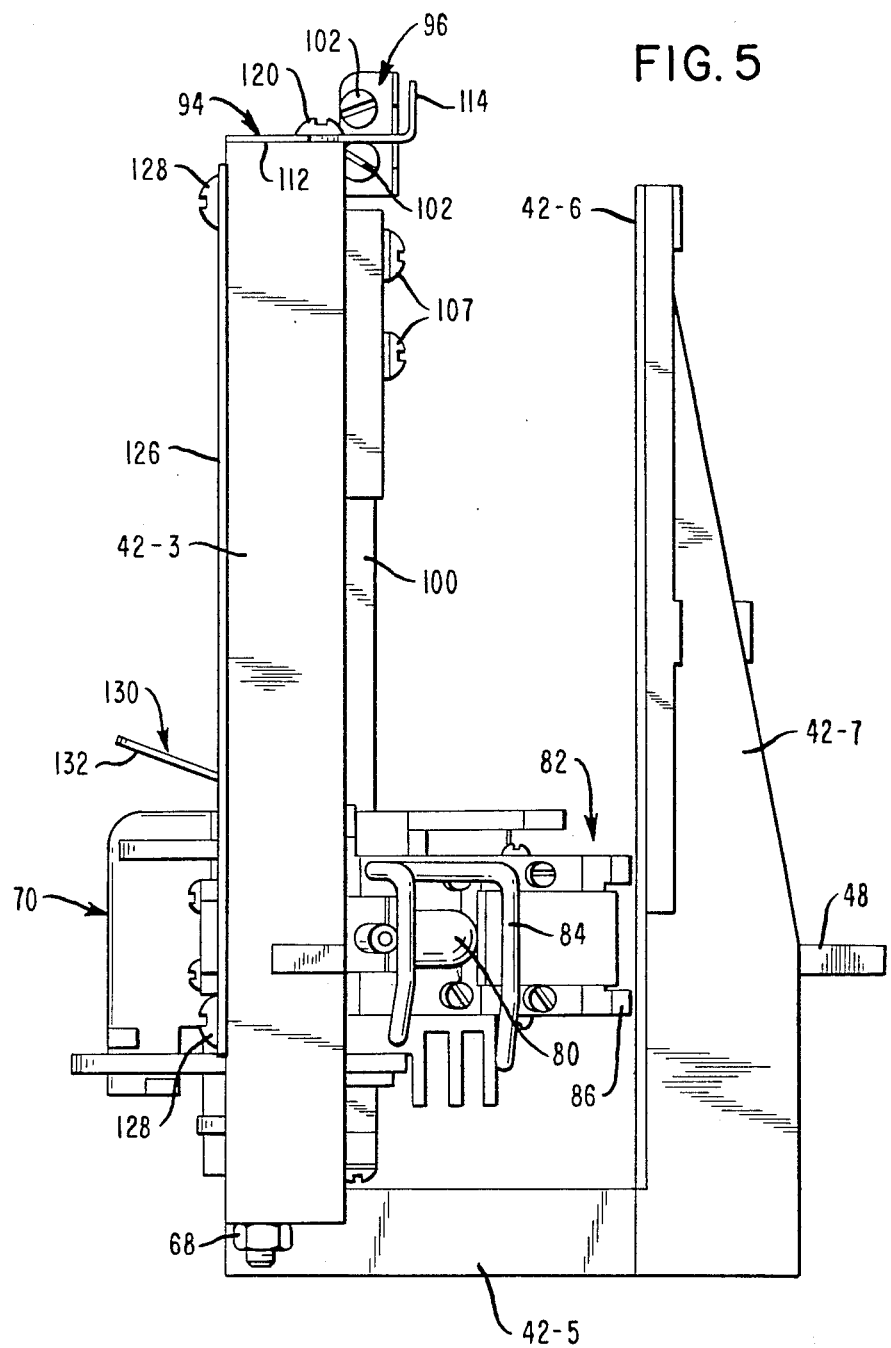
FIG. 5 is an end view, in elevation, of the apparatus shown in FIG. 3 while looking in an upstream direction relative to document travel through the reader module.
Figure 6:
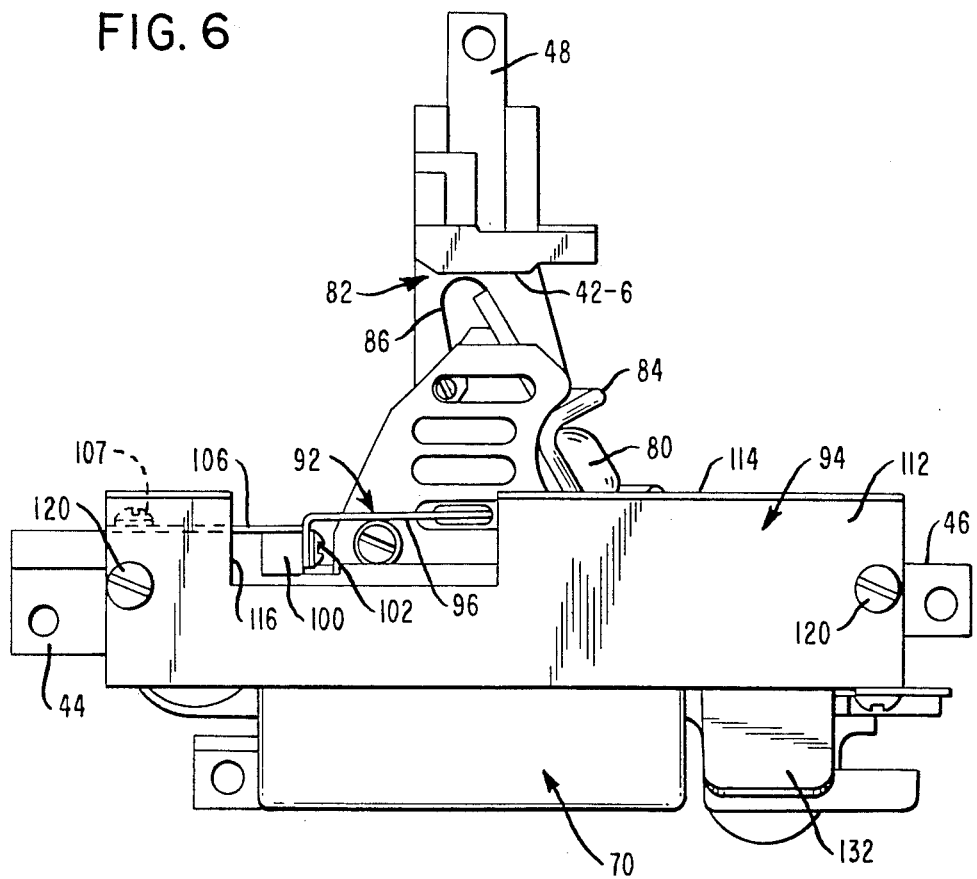
FIG. 6 is a top, plan view of the apparatus shown in FIG. 4.

After all the elements shown in FIGS. 4, 5, and 6 are assembled on the frame member 42 as described, the frame member 42 is fitted into the complementary-shaped opening 50 (FIG. 8) in the supporting plate 52, thereafter, the lugs 44, 46, and 48 are secured to the supporting plate 52 by fasteners 144, 146, and 148, respectively.

Continuing with a description of the reader module 22, the document track 28, shown only schematically in FIG. 1, has a portion thereof shown in more detail in FIG. 8. The document track 28 includes front and back walls 28-1 and 28-2 which are spaced apart to receive a stream of spaced documents 26 therebetween, and it also includes the area 88 which is the bottom of the track 28 on which the documents 26 are moved. The bottom area 88 may be part of one of the walls 28-1 and 28-2. The front and backwalls 28-1 and 28-2 are fastened to the supporting plate 52 by suitable fasteners 150 and 152, respectively. The document track 28 also includes the front and back walls 28-3 and 28-4 which are located downstream of the reading station 82. The bottom area 90, alluded to earlier herein, may be part of the walls 28-3 or 28-4 which are secured to the supporting plate 52 by fasteners 158 and 160, respectively. A document 26 enters the reading module 22 at walls 28-1 and 28-2 of the document track 28 which are located upstream from the reading station 82, and the document 26 leaves the reading module 22 via the walls 28-3 and 28-4 which are located downstream of the reading station 82.

When a document 26 enters the reading module 22, it is moved past the reading station by a plurality of drive rollers and back-up or pinch rollers which are part of the document transport 30 shown only schematically in FIG. 1. The document transport 30 includes the drive rollers 162 and 164 and their associated pinch rollers 166 and 168, respectively. As a document 26 moves along the document track 28, it is driven to the reading station 82 by the drive roller 162 and the associated pinch roller 166 which is canted or angled slightly, as will be described hereinafter, to direct the long lower edge 38 of the document 26 into engagement with the bottom areas 88 and 90 of the track 28. Drive roller 164 and pinch roller 168 similarly drive the document 26 further downstream to the drive roller 170 and its associated pinch roller 172. The drive rollers 162 and 164 may be what are considered "hard" rollers to drive the documents 26 at a constant speed past the reading station 82. The drive roller 170 may be a "soft" roller in that the roller 170 can "slip" on the document without abrading it. The drive roller 170 is driven at a higher speed than are rollers 162 and 164 so as to clear documents away from the reading station 82 after they are read. The drive roller 170 and its associated pinch roller 172 move the documents 26 further downstream to the pocketing apparatus 32, for example, as shown in FIG. 1.

Having described, generally, the various components in the reader module 22, it now appears useful to describe how the read head 70 is adjusted to position it at the desired level for reading the MICR line 36 of data on the documents 26. In order to do this, a document 26 is placed on the guiding member 94 against the planar section 114 so that its long, lower edge 38 contacts the common corner between the planar sections 112 and 114 and so that the indicator 92 is positioned in front of the document as viewed from the position shown in FIG. 4. Thereafter, the locking device 130 is unlocked, permitting the read head 70 to be moved upwardly from the home position shown in FIG. 4. As the read head 70 is moved upwardly, the indicator 92 is also moved upwardly with the read head 70. The document 26 on the supplemental guiding member 94 is positioned so that the MICR line of data 36 is seen at the cut out 98. The read head 70 is adjusted upwardly and downwardly until the cut out 98 on the indicator 92 brackets the MICR line 36 of data on the document 26. Thereafter, the locking device 130 is released to lock the read head 70 in the adjusted position, and the position of the read head 70, as indicated by the arrow 124 and the scale 126 (FIG. 4), is noted. Several samples of documents 26 may be positioned as described to make sure that the setting of the read head 70 is appropriate for the documents 26 to be read. The reader module 22 is dimensioned so that when a document 26 is positioned on the guiding member 94 as described, the horizontal reading center line (not shown) of the read head 70 is positioned above the areas 88 and 90 (FIG. 8) of the document track 28 the same distance as the horizontal center line (not shown) of the cut out 98 of the indicator 92 is above the planar section 112 of the supplemental guiding member 94. Several documents 26 can be test read after the read head 70 is adjusted as described so as to optimize the readings (by raising or lowering the read head), and thereafter, the reading on the scale 126 is noted. At a later time after the read head 70 is moved for cleaning, it can be set to the predetermined reading on the scale 126 to minimize the set up time. If the indicator 92 is left in a raised position above the home position shown in FIG. 4 and a cover (not shown) for the reader module 22 is lowered inadvertently, the indicator 92 will be pushed downwardly (as viewed in FIG. 4) by the cover without damage to the cover due to the magnetic coupling between the magnet 108 and the read head 70. This is a feature of this invention.

Another feature of this invention lies in how the drive rollers 162 and 164 (FIG. 8), already alluded to, are mounted in the module 22. In this regard, drive roller 162 and an associated, lower drive roller 162-1 (FIG. 9)

are fixed to the shaft 174 to rotate therewith. The shafts 174 and 176 pass through loose-fitting openings 178 and 180, respectively, in the supporting plate 52 and are mounted in bearings 182 and 184, respectively. The lower end of shaft 174 has a driving pulley 186 secured thereto to rotate the shaft 174, and similarly the shaft 176 has a driving pulley 188 secured thereto to rotate the shaft 176. The bearings 182 and 184 are positioned between the supporting plate 52 and an inverted, "U"-shaped member 190 having a central section 192 and depending legs, like 194.

An assembly jig 196 (FIG. 9) is used to assemble the drive rollers, like 162 and 164 to the supporting plate 52. In this regard, the assembly jug 196 includes two thick plates 198 and 200 which are maintained in spaced, parallel relationship with each other by a conventional support structure shown only as dashed line 202. The support structure 202 enables the two plates 198 and 200 to be moved towards and away from each other and locked in various, spaced-apart distances. The plate 198 has spaced, parallel holes 204 and 206 therein which are axially aligned with the spaced, parallel holes 208 and 210 in the plate 200. The shafts 174 and 176 are restrained conventionally from axial movement by the bearings 182 and 184 which are initally, loosely secured to the supporting plate 52 by fasteners 212 and 214, respectively.

Figure 9:
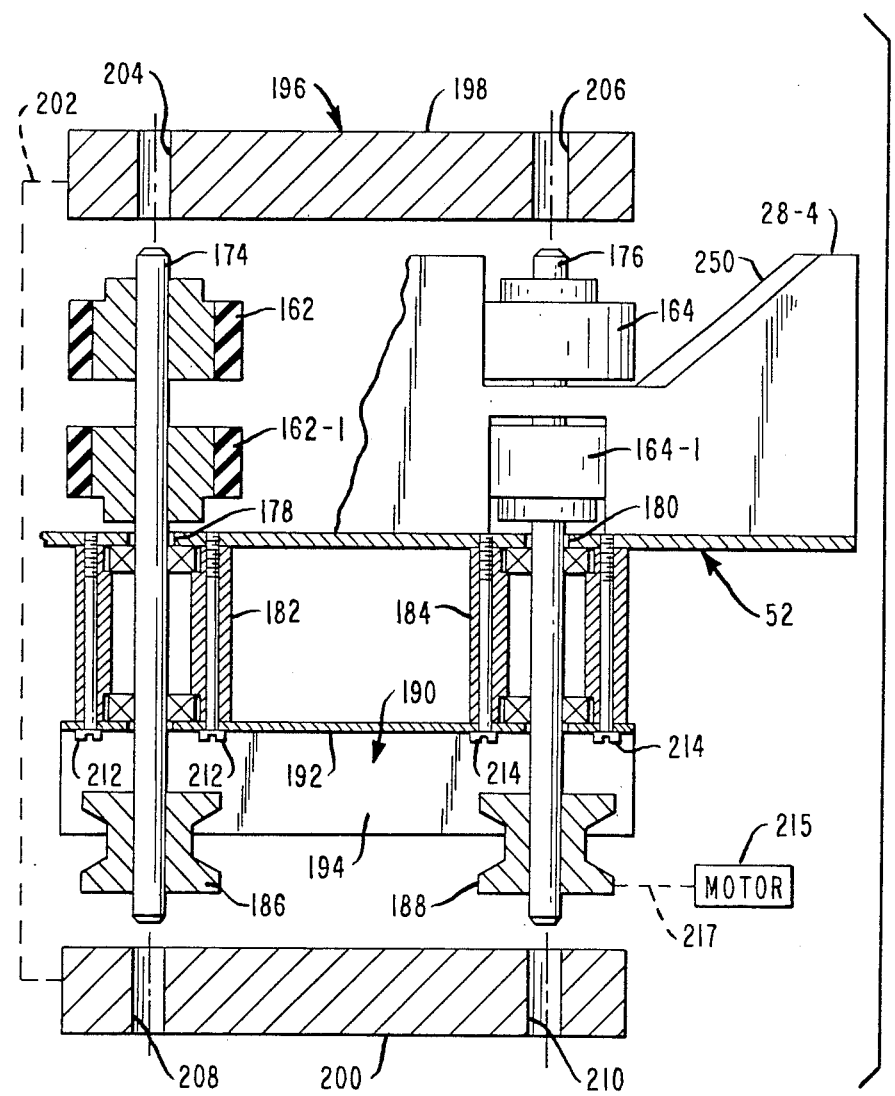
FIG. 9 is a modified, cross-sectional view, taken approximately along the line 9—9 of FIG. 8, to show the means for mounting certain drive rollers in the reader module.

To assemble the portion of the reader module 22 shown in FIG. 9, the lower end of shaft 174 is inserted into hole 208 in plate 200, and similarly, the shaft 176 is inserted into hole 210 in plate 200. Thereafter, shafts 174 and 176 are inserted into holes 204 and 206 of plate 198 by moving the plate 198 towards the plate 200; this maintains shafts 174 and 176 in spaced, parallel relationship with each other. Then, the bearings 182 and 184 are secured to the supporting plate 52 by tightening the fasteners 212 and 214, respectively. The "U"-shaped member 190 provides a stiffening support for maintaining the shafts 174 and 176 in spaced, parallel relationship with each other, thereby minimizing unwanted skew problems by the associated driving rollers, like 162 and 164. There is also some looseness in the holes in the central section 192 of the "U"-shaped member 190 adjacent to the heads of the fasteners 212 and 214 and the bearings 182 and 184 to permit the bearings 182 and 184 to be located and fastened to the supporting plate 52 in a zero-stress environment. After the bearings 182 and 184 are secured to the supporting plate 52, the resulting assembly is removed from the assembly jig 196 and installed in the reader module 22. A motor 215, under the control of the controller 34, is coupled to the driving pulleys 186 and 188 by conventional driving belts, for example, which are shown by a dashed line 217.

Figure 10:
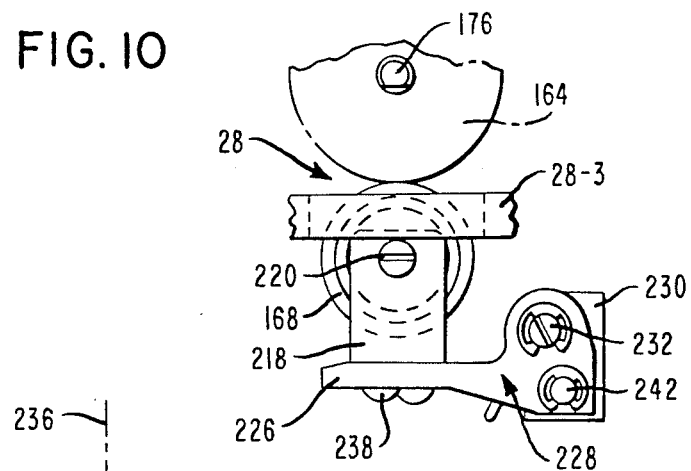
FIG. 10 is a plan view of a pinch roller mechanism used in this invention.
Figure 11:
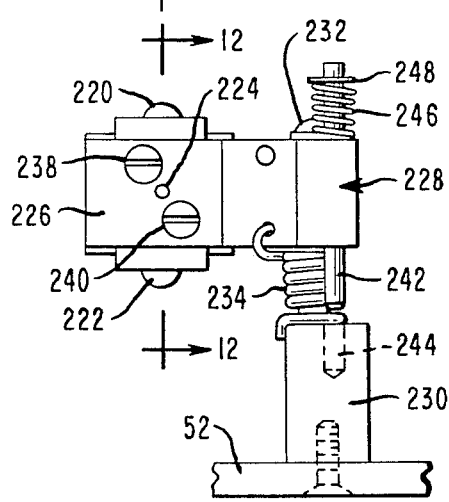
FIG. 11 is a side view, in elevation, of the mechanism shown in FIG. 10.
Figure 12:
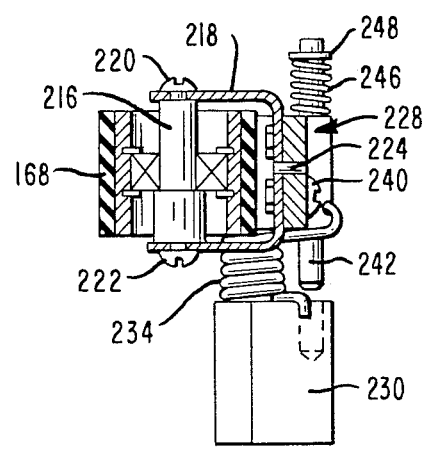
FIG. 12 is a cross sectional view, taken along the line 12—12 of FIG. 11, to show additional details of the mechanism.

Another feature of this invention resides in the mounting of the pinch rollers 166 and 168 (FIG. 8) which cooperate with the driving rollers 162 and 164, respectively, to minimize unwanted skewing problems with respect to the documents 26 being fed along the document track 28, and which mounting facilitates clearing jammed documents 26 from the document track 28. In this regard, FIG. 10 shows a plan view of pinch roller 168 and enough of the document track 28 and the drive roller 164 to orient the reader. The pinch roller 168 is rotatably mounted on an axle 216 (FIG. 12) which is positioned between the legs of a "U"-shaped bracket 218 and secured thereto by fasteners 220 and 222, as shown best in FIG. 12. The "U"-shaped bracket 218 is pivotally mounted (via a pin 224 shown in FIG. 11) to the free end 226 of a mounting arm designated generally as 228. The mounting arm 228 is pivotally mounted on a support block 230 via a fastener 232, and a torsion type spring 234 is coupled between the free end 226 and the support block 230 to resiliently bias the pinch roller 168 towards the drive roller 164 (FIG. 10). The "U"-shaped bracket 218 is pivoted slightly or rotated about pin 224 in a clockwise direction from the position shown in FIG. 11 so that the axis of the associated fastener 216 is tilted slightly from vertical shown by line 236 (FIG. 11). This causes the pinch roller 168 to cooperate with the drive roller 164 to move a document 26 to the right, as viewed in FIG. 10, and also to move the long lower edge 38 of the document 26 downwardly, as viewed in FIG. 11, into reading relationship with the read head 70 as previously described. After the desired amount of skew or downward driving of a document 26 is established by a pinch roller 168, the fasteners 238 and 240 are tightened to secure the bracket 218 in the adjusted position. There is looseness between the fasteners 238 and 240 and their associated mounting holes (not shown) in the mounting arm 228 to provide for the skewing adjustment mentioned.

When a document jam occurs near the reading station 82, the pinch roller 168, for example, may be moved away from its associated drive roller 164 by an operator by pivoting the arm 226 (FIG. 8) in a counter clockwise direction about the fastener 232. As the arm is moved in this direction, a pin 242 (FIG. 11) becomes aligned with a hole 244 in the support block 230. When this alignment occurs, the pin 242 is pushed downwardly by an operator (as viewed in FIG. 11) against the bias of compression spring 246 to move the pin 242 into the hole 244 in the support block 230. There is sufficient friction between the pin 242 and the hole 244 to enable the pin 242 to be retained in the hole 244 against the bias of spring 246 to thereby enable the pinch roller 168 to be held in a retracted position after the free end 226 of the mounting arm 228 is released. The pin 242 is slidably mounted in the mounting arm 228, and the spring 246 is retained between the mounting arm 228 and a "C" washer 248 which is fixed to the upper end of the pin 242 as shown in FIG. 11. To release the pinch roller 168 from the retracted position described, the free end 226 is moved slightly further in a clockwise direction as viewed in FIG. 8 or 10. This movement minimizes the friction between the pin 242 and the hole 244, enabling the spring 246 to move the pin 242 upwardly, thereby clearing the lower end thereof from the hole 244. The free end 226 of the mounting arm 228 can then be released, enabling the torsion spring 234 to rotate or pivot the pinch roller 168 into operative engagement with the drive roller 164. The pinch roller 166 is mounted on the mounting arm 250 (FIG. 8) by a construction which is identical to mounting arm 228 but a mirror image of it. This construction permits the pinch rollers 166 and 168 to be easily replaced when worn.

Another feature of this invention lies in the construction of the document track near the read station 82. In this regard, the wall 28-4 of the document track has a cut out area 250 as shown in FIG. 9. This enables an operator to grasp documents 26 which may become jammed near the read station 82. The retractable, pinch rollers 166 and 168 also facilitate the removal of jammed documents.

The reader module 22 also includes a magnetic exciter or write head 252 (FIG. 8) which excites the MICR line 36 of data on the document 26 before it is read magnetically by the magnetic read head 254. There is suitable shielding 256 and 258 positioned around the read head 254 to minimize stray interference.

What is claimed is:

1. A document reader comprising:
   a frame member having a first section having a first planar surface thereon and also having a second section having a second planar surface thereon, said first and second sections being in spaced parallel relationship to each other and said first and second planar surfaces being in spaced parallel relationship with each other; said frame member also having a guide surface which is upstanding from said frame member and perpendicular to said first planar surface;
   transporting means for moving documents on their lower edges along a line which is parallel to said first planar surface and also for moving said documents in a plane which is parallel to said guide surface;
   a read head;
   support means for supporting said read head for movement in a direction which is perpendicular to said first planar surface and parallel to said guide surface; and
   adjusting means for adjustably fixing said read head at a predetermined distance from said first planar surface;
   said adjusting means including an indicator which is coupled to said read head to move therewith; said read head when moved to align said indicator with a line of data on a said document positioned on said second planar surface being effective to position said read head at said predetermined reading distance from said first planar surface.

2. A document reader comprising:
   a frame member having first and second planar surfaces fixed in spaced parallel relationship with each other and a guide surface which is upstanding from said frame member and perpendicular to said first planar surface;
   transporting means for moving documents on their lower edges along a line which is parallel to said first planar surface and also for moving said documents in a plane which is parallel to said guide surface;
   a read head;
   support means for supporting said read head for movement in a direction which is perpendicular to said first planar surface and parallel to said guide surface; and
   adjusting means for adjustably fixing said read head at a predetermined distance from said first planar surface;
   said adjusting means including an indicator which is coupled to said read head to move therewith, said indicator when aligned with characters to be read on said document being effective to thereby position said read head said predetermined distance form said first planar surface to enable said characters on said document to be read when said document is moved on its lower edge along said line.
   said adjusting means including a stationary distance scale and an associated pointer which is coupled to said read head to move therewith to enable said read head to be re-positioned at said predetermined distance from said first planar surface.

3. The document reader as claimed in claim 2 in which said adjusting means includes coupling means to enable said indicator to move with said read head and also to enable said indicator to be separated from said read head when said read head is positioned at said predetermined distance from said first planar surface.

4. The document reader as claimed in claim 3 in which said coupling means is magnetic.

5. The document reader as claimed in claim 4 in which said indicator includes a planar surface having a cut out therein for use in aligning characters on said documents with said cut out.

6. The document reader as claimed in claim 4 in which said transporting means includes a skew adjustment means for directing said lower edges of said documents along said line as they are moved in parallel relationship with said guide surface.

7. The document reader as claimed in claim 1 in which said transporting means comprises:
   a document track having said line which is parallel to said first planar surface being located therein;
   driving rollers and idler rollers positioned on opposed sides of said document track for transporting said documents on their lower edges along said line and in parallel relationship with said guide surface; and
   at least one of said idler rollers having skew adjustment means for directing documents towards said line.

8. The document reader as claimed in claim 7 in which said at least one idler roller includes mounting means for mounting the associated idler roller for movement between operative and inoperative positions with regard to the associated driving roller and also for releasably locking said idler roller in said inoperative position.

9. The document reader as claimed in claim 8 in which said documents track has notches therein near the location of said idler rollers to facilitate the removal of said documents which may become jammed nenar said idler roller.

10. The document reader as claimed in claim 9 in which said read head is an optical read head.

11. A document reader module comprising:
    support means for supporting said reader module including a frame member having first and second planar surfaces fixed in spaced parallel relationship with each other and a guide surface which is upstanding from said frame member and perpendicular to said first planar surface;
    a read station having said guide surface located thereat;
    transporting means for moving documents to be read to said read station;
    said transporting means including a document track having first and second track bottom areas located on opposed sides of said guide surface with said first and second track bottom areas being located on an aligning line which is parallel to said first planar surface; said transporting means moving said documents on their lower long edges along said aligning line and also moving said documents in a plane which is parallel to said guide surface;
    a read head located at said read station;
    support means for supporting said read head for movement in a direction which is perpendicular to said first planar surface and parallel to said guide surface; and adjusting means for adjustably fixing said read head at a predetermined reading distance form said aligning line which is parallel to said first planar surface;

said adjusting means including an indicator which is coupled to said read head to move therewith; said read head when moved to align said indicator with a line of data on a said document positioned on said second planar surface being effective to position said read head at said predetermined reading distance from said aligning line.

12. The document reader module as claimed in claim 11 in which said adjusting means includes a stationary distance scale and an associated pointer which is coupled to said read head to move therewith to enable said read head to be re-positioned at said predetermined reading distance from said aligning line.

13. The document reader module as claimed in claim 12 in which said adjusting means include coupling means to enable said indicator to move with said read head and also enable said indicator to be separated from said read head when said read head is positioned at said predetermined reading distance from said aligning line.

14. The document reader module as claimed in claim 13 in which said coupling means is magnetic.

15. The document reader module in claim 14 in which said indicator includes a planar surface having a cut out therein for use in aligning said line of data on a said document with said cut out.

16. The document reader module as claimed in claim 14 in which said transporting means includes a skew adjustment means for directing said lower edges of said documents along said aligning line as they are moved in parallel relationship with said guide surface.

17. The document reader module as claimed in claim 11 in which said support means includes a planar support member with said frame member being mounted thereon so that said first planar surface is parallel to said planar support member;

said transporting means including driving rollers and idler rollers positioned on opposed sides of said document track and mounted on said planar support member for moving said document on their lower edges along said aligning line and also for moving said documents in said plane which is parallel to said guide surface; and at least one of said idler rollers having skew adjustment means for directing said document towards said aligning line.

18. The document reader module as claimed in claim 17 in which each of said idler rollers includes mounting means for mounting the associated idler roller for movement between operative and inoperative positions with regard to the associated said driving roller and also for releasably locking said idler roller in said inoperative position.

19. The document reader module as claimed in claim 18 in which said document track has notches therein near the location of said idler rollers to facilitate the removal of said documents which may become jammed near said idler rollers.

20. The document reader as claimed in claim 9 in which said read head is optically operated.

21. The document reader module as claimed in claim 11 in which said transporting means includes driving rollers and associated pinch roller constructions for moving said documents in reading relationships with said read station; at least one of said pinch roller constructions comprising:

a supporting block;

a supporting arm having a free first end and a second end which is pivotally mounted on said supporting block;

a roller;

mounting means for mounting said roller on said free first end;

first biasing means for moving said roller into an operative position with respect to the associated said driving roller; and locking means for locking said roller in a retracted position when said roller is moved from said operative position to said retracted position;

said locking means comprising:

a rod slidably mounted in said second end of said supporting arm;

said supporting block having a hole therein to receive said rod; and second biasing means to bias said rod in a direction away from said hole;

said hole in said block being aligned with said rod when said roller is moved to said retracted position to enable an operator to push said rod into said hole against the bias of said second biasing means to thereby lock said roller in said retracted position.

22. The document reader as claimed in claim 21 in which said mounting means comprises:

a "U"-shaped bracket having first and second free ends;

a supporting rod for rotatably supporting said roller with said supporting rod being supported in said first and second free ends of said "U"-shaped bracket;

a pin for pivotally mounting said "U"-shaped bracket on said free first end of said supporting arm to provide a skew adjusted position for said roller; and means for fastening said "U"-shaped bracket in said skew adjusted position.

* * * * *

UNITED STATES PATENT AND TRADEMARK OFFICE
CERTIFICATE OF CORRECTION

PATENT NO. : 4,764,976

DATED : August 16, 1988

INVENTOR(S) : Fredrik L.N. Kallin et al.

It is certified that error appears in the above-identified patent and that said Letters Patent is hereby corrected as shown below:

Column 10, line 39, delete "nenar" and substitute --near--.

Column 11, line 2, delete "form" and substitute --from--.

Signed and Sealed this

Tenth Day of January, 1989

Attest:

DONALD J. QUIGG

Attesting Officer

Commissioner of Patents and Trademarks